United States Patent [19]
Griswold et al.

[11] Patent Number: 5,279,860
[45] Date of Patent: Jan. 18, 1994

[54] METHOD OF USING EPOXYSILICONE CONTROLLED RELEASE COMPOSITION

[75] Inventors: Roy M. Griswold, Ballston; Michael J. O'Brien, Clifton Park, both of N.Y.

[73] Assignee: General Electric Company, Waterford, N.Y.

[21] Appl. No.: 923,115

[22] Filed: Jul. 30, 1992

[51] Int. Cl.$^5$ .................. B05D 3/02; C08G 77/14
[52] U.S. Cl. ..................... 427/386; 427/387; 528/15; 528/31; 528/32; 528/40; 528/19; 525/476; 525/478; 525/479
[58] Field of Search .............. 525/476, 478, 479; 528/15, 19, 31, 32, 40; 427/386, 387

[56] References Cited

U.S. PATENT DOCUMENTS

| | | | |
|---|---|---|---|
| 4,061,609 | 12/1977 | Bobear | 260/9 |
| 4,157,357 | 6/1979 | Mine et al. | 525/476 |
| 4,279,717 | 7/1981 | Eckberg et al. | 528/32 |
| 4,448,815 | 5/1984 | Grenoble et al. | 427/387 |
| 4,547,431 | 10/1985 | Eckberg | 428/413 |
| 4,576,999 | 3/1986 | Eckberg | 525/476 |
| 4,640,967 | 2/1987 | Eckberg | 528/26 |
| 4,684,670 | 8/1987 | Eckberg et al. | 522/13 |
| 4,721,764 | 1/1988 | Fujiki et al. | 528/15 |
| 4,912,188 | 3/1990 | Colas et al. | 528/15 |
| 4,923,944 | 5/1990 | Yamada et al. | 528/15 |
| 4,952,657 | 8/1990 | Riding et al. | 528/27 |
| 4,988,743 | 1/1991 | Eckberg | 522/99 |

OTHER PUBLICATIONS

Pleudemann et al., "Epoxyorganosiloxanes", *Journal of American Chemical Society*, vol. 81, pp. 2632-2635, 1959.

Hardman et al., "Silicones", *Encyclopedia of Polymer Science and Engineering*, vol. 15, 2nd edit., pp. 206-209, John Wiley & Sons (New York), 1989.

Speier, J. L., "Homogeneous Catalysis of Hydrosilation by Transition Metals", *Advances in Organometallic Chemistry*, vol. 17, pp. 407-447, Academic Press, 1979.

*Primary Examiner*—Melvyn I. Marquis
*Assistant Examiner*—Margaret W. Glass

[57] ABSTRACT

The invention provides a method of producing a controlled release surface for use with a pressure sensitive adhesive by using an epoxy-functional silicone resin in an addition curable silicone release coating composition. More particularly the epoxy-functional silicone resin contains tri- or quadri-functional siloxane units, for use in a vinyl-functional base silicone release coating, thereby providing a thermal and addition curable, controlled release coating composition.

13 Claims, No Drawings

METHOD OF USING EPOXYSILICONE CONTROLLED RELEASE COMPOSITION

CROSS-REFERENCE TO RELATED APPLICATIONS

This application is related to EPOXYSILICONE CONTROLLED RELEASE COMPOSITION, Roy Melvin Griswold and Michael Joseph O'Brien, U.S. Ser. No. 07/923,114 the entire specification which is incorporated herein by reference.

FIELD OF THE INVENTION

The present invention relates to a method of producing a controlled release surface for use with a pressure sensitive adhesive by using an epoxy-functional silicone resin in an addition curable silicone release coating composition. More particularly the epoxy-functional silicone resin contains tri- or quadri-functional siloxane units, for use in a vinyl-functional base silicone release coating, thereby providing a thermal and addition curable, controlled release coating composition.

TECHNOLOGY REVIEW

Silicone compositions have become widely accepted as release coatings, which are useful to provide a surface or material that is relatively non-adherent to other materials which would normally adhere closely thereto. Silicone release compositions are useful as coatings with release pressure sensitive adhesives for labels, decorative laminates, transfer tapes, etc. Silicone release coatings on paper, polyethylene, and other such substrate are also useful to provide non-stick surfaces for food handling and industrial packaging.

Silicone release coating compositions are well known in the art. Traditionally, non-functional and vinyl-functional silicone resins have been used as controlled release additives for silicone release coatings. In general, a resin and/or fluid mixture of vinyl-functional silicone and SiH-functional silicone cross-linking agent is cured in the presence of a precious metal catalyst by the well known hydrosilation addition reaction. By varying the amount of vinyl-functional silicone resin added to base silicone composition, a variety of release levels can be obtained from a given system.

Presently release coatings are of two basic types, heat cured and UV cured. Heat cured release coating compositions contain terminally and/or on-chain vinyl-substituted silicone polymer SiH functional silicone cross-linking agent, hydrosilation addition reaction promoting catalyst and addition reaction inhibitor. Heat is employed to deactivate the inhibitor and allow the hydrosilation addition reaction to proceed.

There is a continuing need in the release coating industry to develop materials with "differential release" characteristics. In other words, there are wanted release coatings, the release of which may be adjusted to various levels as desired. With "differential release", premature release can be prevented while accounting for easy release when desired.

U.S. Pat. No. 4,448,815 discloses a heat curable release coating composition crosslinked by addition reaction in the presence of platinum catalyst. There is no teaching as to a controlled release.

U.S. Pat. No. 4,576,999 discloses a UV radiation curable release coating composition crosslinked by addition reaction in the presence of platinum catalyst. Again, there is no teaching as to controlled release.

U.S. Pat. No. 4,547,431 discloses UV radiation curable epoxy-functional silicone further containing polyfunctional epoxy monomers. The additional monomers provide quantitative variable release. In this case, heat cure to produce a release coating was not reported.

U.S. Pat. No. 4,684,670 discloses UV curable silicone terpolymers wherefrom differential release was achieved, but control of this differential release was not obtained.

U.S. Pat. No. 4,952,657 discloses UV curable, phenol-modified epoxysilicones as controlled release compositions. It is disclosed that the greater the content of phenol-modified silicone resin, the greater the release value that is obtained.

Co-pending, commonly-assigned U.S. application No. 07/573,416, filed Aug. 24, 1990 discloses UV-curable epoxysilicones for producing controlled release coatings. The utility of the incorporation of tri- and quadri-functional siloxane units with respect to the coating is not disclosed.

There may also be employed in release coating compositions additional silicones for their ordinary purpose which contain no siloxane units with a release modifying substitution. For example, an unmodified hydride-substituted silicone may be employed to perform the major part of the crosslinking function, however, it is preferred that there be minimal SiH since this creates unstable release on aging and lock-up with several adhesives. Thus, it is not critical that each polymer of a release coating composition be epoxy-modified. It is critical, however, that there be sufficient release modified organopolysiloxane with sufficient units having release modifying substitution to increase release in the cured composition.

There is thus a need for additional silicone release coating additives wherefrom stable controlled release can be obtained. In particular, there is a need for controlled release coatings which are economical, easy to manufacture from readily available materials, and which provide for greater levels of release than traditional vinyl-substituted additives and be solventless to minimize dealing with solvents and solvent recovery. This resulting in a more environmentally sound product.

SUMMARY OF THE INVENTION

The present invention provides a method of using a controlled release additive to produce a controlled release surface comprising the steps:

(i) applying a curable organopolysiloxane release coating composition to a surface with the composition comprising:
(A) from about 1 to about 98% by weight of the curable composition, and preferably 5 to about 90% by weight of the curable composition of an epoxy-functional siloxane which functions as a release additive to control adhesion comprising unit(s) of the formula:

 (I)

and unit(s) of the formula:

 (II)

and/or $$SiO_{4/2} \qquad (III)$$

where R is unsubstituted or substituted $C_{(1-8)}$ alkyl, $R^1$ is a monovalent epoxy-functional organic radical of from 2 to about 20 carbon atoms; a is 1, 2 or 3; b is 0, 1, 2 or 3; and a+b is 2 or 3; and with the provision that at least one unit of forumula (I) contains an unsubstituted or substituted epoxy-functional radical per molecule;

(B) from about 1 to about 98% by weight of the curable composition of a vinyl-functional siloxane which functions as a release compound's base composition with from about at least 2 to about 6 units of the formula:

$$R_c R_d^2 SiO_{(4-c-d)/2}$$

where R is as defined above, $R^2$ is unsubstituted or substituted vinyl-functional $C_{(1-8)}$ alkenyl; c is 0, 1, 2 or 3; d is 0, 1, 2 or 3; and c+d is 2 or 3.

(C) an effective amount of a temperature-dependent hydrosilation addition reaction inhibitor;

(D) an effective amount of a hydrosilation catalyst; and (E) from about 1 to about 10% by weight of the curable composition of an organopolysiloxane which functions as a crosslinker consisting essentially of units of the formula and/or combinations thereof:

$$R_e(H)_f SiO_{(4-e-f)/2}$$

where R is defined in (A), e is 0, 1, or 2; f is 0, 1, 2, or 3; and e+f is 0, 1, 2 or 3.

(ii) heating the composition applied in step (i) to a temperature from between about 70° C. to about 300° C., until said composition cures.

DETAILED DESCRIPTION OF THE INVENTION

The present invention provides a method of using a controlled release additive to produce a controlled release surface, by applying an organopolysiloxane release coating composition to a surface with the organopolysiloxane comprising an epoxy-siloxane which contains tri- or quadri-functional siloxane units which acts as a useful controlled release additive in thermal and addition cured organopolysilicone release coating composition, and by incorporation of the epoxy-silicone into a release coating composition. Then by heating the organopolysiloxane composition applied the surface to a temperature from between about 70° C. to about 300° C., such that said composition cures. A variety of release levels above those normally achievable can be obtained from a given vinyl-functional siloxane base resin. Additionally, the cure of these epoxysilicone resins provides incorporation of polar ether groups directly into the silicone backbone.

The invention provides a method of using a controlled release additive to produce a controlled release surface comprising the steps:

(i) applying a curable organopolysiloxane release coating to a surface of a composition comprising:

(A) from about 1 to about 98% by weight of the curable composition, and preferably 5 to about 90% by weight of the curable composition of an epoxy-functional siloxane which functions as a release additive to control adhesion comprising unit(s) of the formula:

$$R_a R_b^1 SiO_{(4-a-b)/2} \qquad (I)$$

and unit(s) of the formula:

$$RSiO_{3/2} \qquad (II)$$

and/or $$SiO_{4/2} \qquad (III)$$

where R is unsubstituted or substituted $C_{(1-8)}$ alkyl, $R^1$ is a monovalent epoxy-functional organic radical of from about 2 to about 20 carbon atoms; a is 1, 2 or 3; b is 0, 1, 2 or 3; and a+b is 2 or 3; and with the provision that at least one unit of formula (I) contains an unsubstituted or substituted epoxy-functional radical per molecule;

(B) from about 1 to about 98% by weight of the curable composition of a vinyl-functional siloxane which functions as a release compound's base composition with from about at least 2 to about 6 units of the formula:

$$R_c R_d^2 SiO_{(4-c-d)/2}$$

where R is as defined above, $R^2$ is unsubstituted or substituted vinyl-functional $C_{(1-8)}$ alkenyl; c is 0, 1, 2 or 3; d is 0, 1, 2 or 3; and c+d is 2 or 3.

(C) an effective amount of a temperature-dependent hydrosilation addition reaction inhibitor;

(D) an effective amount of a hydrosilation catalyst; and (E) from about 1 to about 10% by weight of the curable composition of an organopolysiloxane which functions as a crosslinker consisting essentially of units of the formula and/or combinations thereof:

$$R_e(H)_f SiO_{(4-e-f)/2}$$

where R is defined in (A), e is 0, 1, or 2; f is 0, 1, 2, or 3; and e+f is 0, 1, 2 or 3.

(ii) heating the composition applied in step (i) to a temperature from between about 70° C. to about 300° C., until said composition cures.

The organopolysiloxane release coating composition of the invention can be applied to the surface of cellulosic and other substrate including, for example, paper, metal, foil, polyethylene-coated Kraft paper (PEK), supercalendered Kraft (SCK) paper, polyethylene films, polypropylene films and polyester films to render controlled release surfaces on these materials. In general, coatings can be applied to these substrate at the desired thickness, although thicker applications may necessitate longer cure times. These coatings may be applied in the various manners known in the art. As an example of application, the curable composition of the invention is readily applicable by doctor blade or by casting.

As a release coating in the practice of the invention, the present composition is applied to a substrate at a thickness of between 0.1 mil and about 10 mils; it is also convenient to refer to such coatings in terms of coat weights, typically about 1 g/m² in release coatings.

The application and dispersion of the curable composition of the invention to a substrate may be facilitated if the composition is added as a solution or dispersion in a volatile liquid carrier in which the silicones are soluble. When the curable composition is a polydimethylsiloxane, preferable volatile liquid carriers include, for example, hexane, xylene and toluene. The amount of volatile liquid carrier incorporated into the curable composition of the invention should not exceed about 3% by weight as compared to the total weight of the curable composition, if the advantages of using a relatively solvent-free composition are desired. However higher solvent levels can be used if desired.

Once applied to a substrate and cured, the composition of the invention provides a controlled release surface, with user controlled variable release from pressure sensitive adhesives. As this release is controlled, it is also now possible to produce different surfaces on a single substrate, for example, two sides of a sheet of suitable material, which have different levels of release. Products of this type may be more amenable to automated manufacture than those products previously available. Additionally, the release coating of the invention is readily made from relatively low cost and widely available materials, while at the same time providing greater levels of release than available using vinyl-functional additives. Thus, the invention allows cost-efficient production of release coated products heretofore unavailable.

Any non-epoxy siloxane units of Component (A) have the formula $R_xSiO_{(4-x)/2}$ where R is defined above and x is 0, 1, 2 or 3.

By the term "substituted" herein with respect to alkyl groups, it is meant an organic radical having chloro, bromo, iodo, cyano, carboxy, hydroxy, nitro or other such groups as are known in the art. Additionally, heterocyclic and aromatic heterocyclic organic radicals such as pyranyl, and the like as known in the art are also meant to be encompassed in the definition of "substituted" organic radicals.

Component (A) of the present invention is a siloxane polymer that contain not only mono-functional and di-functional siloxane units, but also tri-functional and quadri-functional siloxane units, or various combinations thereof. Tri-functional siloxane units have the formula $RSiO_{3/2}$, where R is as defined above, while quadri-functional siloxane units have the formula $SiO_{4/2}$. Reference on nomenclature is made to Hardman and Torkelson, "Silicones", in *Encyclopedia of Polymer Science and Engineering*, vol. 15, 2nd edit., pp. 206-209, John Wiley and Sons (New York), 1989.

The epoxysilcone Component (A) of the invention is required to contain either at least one tri-functional or quadri-functional siloxane unit, or both. Most preferably, Component (A) comprises both tri- and quadri-functional siloxane units. The tri-functional units may generally comprise from about 1 to about 99% of the sum of the tri- and quadri-functional units. Preferably, these units are from about 10 to about 90%, and most preferably these units make up from about 25 to about 75% of the sum of the tri- and quadri-functional units. The mono- and di-functional silanes are used in the appropriate ratio to yield the total ratio of formula I unit(s) to the total of formula (II) and (III) units of from about 0.4 to about 2.0, and preferably from about 0.6 to about 1.5.

If Component (A) contains only formula (I) and formula (II) units, the preferred ratio of formula (I) to formula (II) units is form about 0.4 to about 2.0, and the most preferred ratio is from about 0.6 to about 1.5. If Component (A) contains only formula (I) and formula (III) units, the preferred ratio of formula (I) to formula (III) units is from about 0.4 to about 2.0, and the most preferred ratio is form about 0.6 to about 1.5.

The tri-functional and quadri-functional siloxane units have been found to generally increase the adhesiveness of silicone resins. Thus variation in the number of these units in the curable composition of the invention provides for a controlled level of release. Furthermore this variation provides for control of the viscosity of the controlled release additive allowing for a solventless controlled release additive.

Component (A) may be conveniently made from the condensation reaction of the appropriate silanes to produce SiH-functional siloxanes, followed by the partial or complete (as is desired) hydrosilation addition of an ethylenically unsaturated epoxide to these SiH-functional siloxanes.

Examples of appropriate starting silanes are mono-, di- and tri-halogen substituted halogensilanes or mono-, di- or tri-substituted alkoxysilanes for mono-, di-, and tri-functional siloxane units, respectively. Quadri-functional siloxane units may be incorporated into the silicone through the addition of organo orthosilicate, silicon tetrachloride or, most economically, from sodium silicate derived sol-gel into which a mixture of one or more of the above starting materials is added.

For example, dimethylchlorosilane, methyldichlorosilane, and methyltrichlorosilane are useful starting materials for the production of mono-, di- and tri-functional siloxane units, respectively. Additionally, instead of these chlorosilanes, the analogous alkoxysilanes, for example ethoxysilanes, are also useful starting materials.

Epoxysilicones are also commercially available or may be made, for example, as disclosed in U.S. Pat. No. 4,640,967. In general, the epoxy-functional silicone is made from the hydrosilation addition reaction between an ethylenically unsaturated epoxide and a silicone hydride. Examples of suitable ethylenically unsaturated epoxides for generating an epoxysilicone via the hydrosilation reaction include allyl glycidyl ether; methallyl glycidyl ether; 1-methyl-4-isopropenyl cyclohexene oxide; 2,6-dimethyl-2,3-epoxy-7-octene; 1,4-dimethyl-4-vinyl cyclohexene oxide; 4-vinylcyclohexene oxide; vinylnorbornene monoxide; dicyclopentadiene monoxide; 1,2-epoxy-6-heptene; and 1,3-dimethyl butene. The epoxy-functional siloxane Component (A) contains epoxide radicals generated from the addition reaction of, for example, the above ethylenically unsaturated epoxides to an SiH-functional siloxane.

In the preferred composition and method of the invention, Component (A) is a (3,4-epoxy cyclohexyl)ethyl-functional siloxane derived from the addition reaction between 4-vinylcyclohexene oxide and an SiH-functional siloxane.

In practicing the invention, Component (A) may comprise from about 1 to about 98% by weight of the curable composition. Preferably, Component (A) comprises from about 5 to about 90% by weight, and most preferably from about 10 to about 69% by weight of the of the curable composition. The curable composition being the composition without the solvent.

The vinyl-functional siloxane Component (B) of the composition and method of the invention may generally be any such siloxane capable of undergoing a hydrosilation addition reaction with a silicon hydride. The vinyl-functional silicones contain at least two units of the formula

where R is as defined above, $R^2$ is unsubstituted or substituted vinyl-functional $C_{(1-8)}$ alkenyl; c is 0, 1, 2 or 3; d is 0, 1, 2 or 3; and c+d is 2 or 3 and the viscosity range is from about 100 to about 100M cps. By "vinyl-functional" it is meant a siloxane unit containing an organic radical with a vinyl group of the formula $(CH_2=CH)-$. Vinyl-functional siloxanes are well known, and may be prepared through the condensation reaction using the appropriate vinyl-functional halogensilanes or alkoxysilanes as starting materials. For example, dimethylvinylchlorosilane and dimethylvinylethoxysilane are useful for producing terminal-functional siloxane units and methylvinyldichlorosilane or methylvinyldiethoxysilane are useful for preparing on chain functional siloxane units.

Component (B) of the invention may preferably have from about 2 to about 6 of the above vinyl-functional siloxane units per silicone chain, and most preferably from about 2 to about 4. These vinyl-functional units may be either at the terminus of the silicone chain or pendant on the chain or both.

Any non-vinyl-functional siloxane units of Component (B) have the formula $R_ySiO_{(4-y)/2}$, where R is defined above and y is 2 or 3. Thus, in contrast to Component (A), Component (B) of the present invention is a siloxane containing only mono- and di-functional siloxane units.

In practicing the invention, Component (B) may comprise from about 1 to about 98% by weight of the curable composition. Preferably, Component (B) comprises from about 5 to about 94% by weight, and most preferably from about 30 to about 89% by weight of the of the curable composition.

Suitable temperature-dependent hydrosilation inhibitors as Component (C) for use in practicing the invention are known. Such inhibitors include dialkyl carboxylic esters, such as diallylmaleate, or hydroperoxides, such as taught in U.S. Pat. Nos. 4,061,609 and 4,448,815. By "temperature dependent" it is meant that the inhibitor in the curable composition of the invention is effective for retarding a hydrosilation addition cure at ambient temperature, but does not interfere with the hydrosilation reaction at elevated temperatures, for example, at greater than about 100° C.

In general, the amount of inhibitor used in the invention will depend upon the amount of catalyst present. This amount can be easily determined as that required to substantially completely inhibit the addition reaction at ambient temperature. In the range of catalyst given below, Component (C) is useful from about 0.1 to about 15% by weight as compared to the total weight of the curable composition. Preferably, the inhibitor is at from about 0.2 to about 5% by weight, and most preferably from about 0.4 to about 2% by weight, as compared to the total weight of the curable composition. The preferred temperature-dependent hydrosilation inhibitor is diallylmaleate.

In general, suitable hydrosilation catalysts as Component (D) useful in the practice of the invention are complexes of platinum, palladium, rhodium, iridium, iron or cobalt. Such complexes are also well known. Reference is made, for example, to J. L. Speier, "Homogeneous Catalysis of Hydrosilation by Transition Metals", in *Advances in Organometallic Chemistry*, vol. 17, pp. 407–447, F. G. A. Stone and R. West, eds., Academic Press (New York, San Francisco, London), 1979; and Aylett, in *Organometallic Compounds*, vol. 1, p. 107, John Wiley & Sons (New York), 1979. Platinum or rhodium catalysts are preferred, with tris(triphenyl phosphine) rhodium monochloride being most preferred.

The hydrosilation catalyst as Component (D) is most economically employed in the invention at from about 10 to about 300 ppm of precious metal, as compared to the weight of the curable composition, preferably from about 25 to about 200 ppm of precious metal, and most preferably from about 50 to about 150 ppm of precious metal, based upon the total weight of the curable composition.

The organohydrogensiloxane Component (E) of the composition and method of the invention may generally be any SiH containing crosslinker. The organohydrogensiloxanes are contained in organopolysiloxanes consisting essentially of units of the formula:

where R is as defined in (A); e is 0, 1 or 2; f is 0, 1, 2 or 3; and e+f is 2 or 3.

The SiH-functional siloxanes of Component (E) are also well known. They can generally be prepared by the condensation reaction of silanes containing one or two halogens or other hydrolyzable group substitution, similar to as previously described. For use in the practice of the invention, SiH-functional siloxanes may be either SiH-end-stopped or the functional groups may be pendant. In the invention, any SiH-functional siloxanes that may be desired as crosslinker, for example linear and branched polymers containing mono- di-, tri- or quadri functional siloxane units can be employed. By "SiH-functional" it is meant that the polysiloxane contains units with hydride-substituted silicon (—SiH) groups.

In practicing the invention, Component (E) may comprise from about 1 to about 10% by weight of the curable composition. Preferably, Component (E) comprises from about 1 to about 5% by weight of the curable composition.

In one embodiment of the invention, the SiH-functional siloxanes may be completely epoxidized, and a separate, SiH-functional silicone fluid may then used as crosslinking agent.

Even though a volatile solvent is not required, a solvent can be used in the manufacture of Component (A), in the manufacture of the controlled release coating, or to dilute the curable composition for coating a substrate. If desired the preferred solvents are toluene, xylene, hexane or acetone which may be added to the epoxysilicone controlled release composition.

To initiate the thermal and addition cure of the composition of the present invention, a mixture of Components (A), (B), (C), (D) and (E) is brought to a temperature of from about 70° C. to about 300° C., at which the oxirane rings in the epoxysilicone open and thereby react. Preferably, the temperature of the cure reaction is from about 100° C. to about 200° C. Reference is made in this regard to Pleudemann and Fanger, "Epoxyorganosiloxanes", *Journal of the American Chemical Society*, vol. 81, pp. 2632–2635, 1959. As the inhibitor in the mixture is not effective at this elevated temperature, the hydrosilation cure between the vinyl-functional Component (B) and unreacted —SiH groups in an added hydrogen-functional crosslinking silicone also proceeds at this time.

In various embodiments of the invention, an epoxysilicone containing mono-, di- and quadri-functional units is used as Component (A). In other embodiments, mono-, di-, and tri-functional units are present in Component (A). In yet other embodiments, all four types of siloxane units are present in the epoxy-functional Component (A) silicone. It is also possible in the invention to use mixtures of the above epoxy-functional siloxanes as Component (A). Such mixtures may more easily provide for levels of release intermediate to those provided by a single epoxysilicone.

EXAMPLES

In order that persons in the art may better understand the practice of the present invention, the following Examples are provided by way of illustration, and not by way of limitation. Additional background information known in the art may be found in the references and patents cited herein, which are hereby incorporated by reference.

In the shorthand notation of polymer structure below, the following apply:

M represents $(CH_3)_3SiO_{\frac{1}{2}}$;
$M^H$ represents $(CH_3)_2(H)SiO_{\frac{1}{2}}$;
D represents $(CH_3)_2SiO_{2/2}$;
T represents $CH_3SiO_{3/2}$; and
Q represents $SiO_{4/2}$.

Unless indicated otherwise, all silicone resins and fluids are available from General Electric Silicone Division, Waterford, N.Y.

EXAMPLE 1

To a nitrogen purged 500 ml flask equipped with an overhead stirrer, a reflux condenser, thermometer, and addition funnel was charged 116.8 g water. To the addition funnel was charged a mixture of 21.3 g dimethylethoxysilane, 72.1 g dimethyl-dimethoxysilane, 25.0 g tetraethylorthosilicate, 3.9 g trimethylchlorosilane and 37.4 g toluene. This mixture was added to the flask over a one hour period with vigorous agitation. An exotherm from 23° C. to 32° C. was observed. The resulting hydrolyzate mixture was agitated for one additional hour then 4 g sodium chloride was added. The result was phase separated for 40 minutes and the lower acid layer discarded. The organic layer was found to have 114 ppm acidity as HCl and was charged to a 250 ml flask equipped with an overhead stirrer, thermometer, moisture trap, and condenser. The flask was heated at a 126° C. reflux which required removal of 27.3 g volatiles. The flask was cooled to less than 60° C. and 1 g Filtrol 20 ® added. Heating was resumed and volatiles were removed until a 150° C. reflux was reached. The flask was refluxed at 150° C. for one hour, then cooled and filtered through Celite ®. The resulting resin was thin film devolatilized at 85° C., 0.2 mm Hg.

Analysis of the reaction product yielded the following results:

0.27 wt % hydrogen
$^{29}$SiNMR $M:M^H:D:Q = 0.08:0.81:2.23:1.0$
GpC $M_N = 920$
$M_W = 9114$
Polydispersity (D) = 9.9

27.0 g of the above resin and a few grains of tris(triphenylphosphine) rhodium (I) chloride were charged to a 100 ml flask equipped with an overhead stirrer, thermometer, condenser, and addition funnel. 10.0 g of vinylcyclohexene mono-oxide was charged to the addition funnel and slowly added to the flask at 100° C. An exotherm to 140° C. was observed. The flask was heated at 90°-110° C. for two hours, then cooled to 60° C. The resulting epoxy functional resin was devolatized at 60° C., at less than 0.5 mm Hg. Analysis of the addition reaction product gave the following:

FTIR ($^{18}$ 2200 cm$^{-1}$): No unreacted SiH detected.
Solids = 99.1 wt %.
Kinematic viscosity: 597 cst.
NMR SiMe:epoxy = 9.4:1.0.

The above resin designated as S2838-36-1 was release tested in the following formulations:

|  | Formulation | | | |
|---|---|---|---|---|
|  | A | B | C | D |
| SL5000 | 7.5 g | 6.5 g | 5.5 g | 4.5 g |
| SL5010 | 2.5 g | 2.5 g | 2.5 g | 2.5 g |
| SL5040 | 0.05 g | 0.05 g | 0.05 g | 0.05 g |
| SS4300C | 0.5 g | 0.5 g | 0.5 g | 0.5 g |
| S2838-36-1 | 0 | 1.0 g | 2.0 g | 3.0 g |
| Acetone | 18.5 g | 18.5 g | 18.5 g | 18.5 g |
| Hexane | 18.5 g | 18.5 g | 18.5 g | 18.5 g |

Laminants were prepared using a 40# SCK for the release liner and facestock. The release liners were coated using a #4 Mayer rod and then cured at 300° F. for 30 sec. A rubber based National Starch adhesive was use for the laminant adhesive. The constructions were stored at room temperature for one week then delaminated at 400 inches/minute, 180°, liner from facestock on a Scott Tester. The following release results were obtained:

| Formulation | Release (g/2 in) |
|---|---|
| A | 50 |
| B | 70 |
| C | 100 |
| D | 135 |

EXAMPLE 2

Solventless Coating

To a Morton flask equipped with agitation, a thermometer, condenser and addition funnel was added a mixture of 869.7 dimethyldichlorosilane, 96.0 g dimethylchlorosilane, 184.0 g trimethylchlorosilane, 285.0 g tetraethylorthosilicate and 488.0 g toluene. The addition reaction was accomplished over a 2.5 hour period and cooling was applied to the Morton flask to maintain the temperature below 50° C. After addition was completed, the mixture was agitated for 2 hours, and then it was allowed to phase separate. The lower acid layer was discarded, 500 ml water was added to the flask, and the result was agitated for 30 minutes. The contents were allowed to phase separate and once again the lower acid wash was discarded. The acid level for the toluene/hydrolyzate was titrated at less than 10 ppm. This mixture was held at a 150° C. reflux for two hours, then the temperature was increased to 170° C., taking off a total of 608.9 g volatiles. The amount of hydrogen present as Si—H was found to be 0.115%, and the acid level was less than 10 ppm. To 830.0 g of this resin was added 0.1 g tris(triphenylphosphine) rhodium chloride, 154.0 g 4-vinylcyclohexene oxide (VCHO), and 200.0 g toluene. The resulting mixture was heated to a 135° C.

reflux for 3 hours taking off toluene as required. At this point, IR analysis revealed that there was no unreacted SiH present, indicating that the hydrosilation was complete. The material was then devolatized at 70° C., 0.2 mm Hg using a Pope wiped film still. This resin, which was designated 1142-2, had a viscosity of 19 cstk, an epoxy content of 1055 meq/kg, and was evaluated in the following thermal, solventless paper release formulations. The formulations were coated at 1.0 lb/ream on 42#SCK paper using a three roll off-set gravure coater and cured at 200 ft/min with a web temperature of 312° F.

|  | Formulation: | | |
|---|---|---|---|
|  | A | B | C |
| SL5000 | 2790 g | 2190 g | 1710 g |
| SL5010 | 1000 g | 1000 g | 1000 g |
| 1142-2 | — | 600 g | 1080 g |
| Diallylmaleate | 10 g | 10 g | 10 g |
| SS4300C | 200 g | 200 g | 200 g |

Laminants were prepared by solvent casting National Starch adhesive 36-6157 and Monsanto Gelva 263 onto the coated SCK sheets, and then drying at room temperature for 10 minutes followed by 6 minutes at 185° F. Finally, a 42# SCK facestock was applied to complete the laminate. After aging for 4 weeks at room temperature, release values were measured in g/2 in by delaminating at 400 inches/minute, 180°.

|  | NS 36-6157 | Gelva 263 |
|---|---|---|
| Formulation A | 20–25 | 40–45 |
| Formulation B | 50–55 | 90–110 |
| Formulation C | 75–90 | 220–240 |

These results clearly illustrate the fact that 1142-2 acts as a controlled release additive (CRA) against both the rubber based and acrylic type adhesive.

EXAMPLE 3

To a 5l Morton flask equipped with a thermometer, condenser and addition funnel was added 564.0 g water. A mixture of 272.9 g trimethylchlorosilane, 32.4 g dimethylchlorosilane, 300.0 g tetraethylorthosilicate and 206.0 g xylenes was charged to the addition funnel and then added to the water over a 45 minute period of time with vigorous agitation, while maintaining the temperature at less than 50° C. After addition was complete, the reaction mixture was agitated for 1.5 hours, and then it was allowed to phase separate. The lower acid layer was discarded and the organic layer was washed with 500 ml of water. At this point the acid level of the organics was determined to be 9ppm. This mixture was refluxed at 150° C. for 2 hours then it was further heated to 170° C. A total of 255.5 g of volatiles were removed. The amount of hydrogen present as Si—H was determined to be 0.12%. To this material was added 0.01 g tris(triphenylphosphine) rhodium chloride and sufficient toluene to attain at 150° C. reflux then 33.2 g VCHO was added at a slow rate. After heating at 153° C. for an additional 20 hours, the reaction was judged to be complete by IR analysis. Devolatilization at 135° C., less than 0.44mm Hg, yielded 236.0 g of an epoxysilicone resin with a viscosity of 42,000 cps and an epoxy content of 923 meq/kg. This resin was evaluated in the following formulations:

|  | Formulation: | | | |
|---|---|---|---|---|
|  | A | B | C | D |
| SL5000 | 7.5 g | 6.5 g | 5.5 g | 4.5 g |
| SL5010 | 2.5 g | 2.5 g | 2.5 g | 2.5 g |
| SL5040 | 0.03 g | 0.03 g | 0.03 g | 0.03 g |
| SS4300C | 0.4 g | 0.5 g | 0.5 g | 0.5 g |
| Resin | — | 1.0 g | 2.0 g | 3.0 g |

42# SCK was coated with formulations A–D dissolved in hexane (20% solids) using a #4 Mayer rod. Cure was then accomplished by heating the coated sheets at 300° F. for 30 sec. The resulting cured films were determined to have silicone coatweights of approximately 0.8 lb/ream. Under vigorous finger pressure, some rub-off was observed.

Laminants were prepared as in example 1 above and release determined after four weeks room temperature aging.

| Formulation | Release (g/2 in) | % Resin |
|---|---|---|
| A | 40–50 | 0 |
| B | 55–70 | 10 |
| C | 75–80 | 20 |
| D | 110–120 | 30 |

Once again, addition of this resin clearly caused an incremental increase in release relative to the control (formulation A).

EXAMPLE 4

To illustrate that other unsaturated epoxy materials can be used in addition to vinylcyclohexene oxide, an additional batch of the methylhydrogen resin from Example 2 was prepared and divided into three 170.0 g portions. 0.008g the same rhodium catalyst was added to each followed by: to portion A, 28.5 g allylglycidylether; to B, 22.8 g 1,2-epoxy-5-hexene; and to C, vinylcyclohexene oxide (VCHO). These were heated at 145° C. until IR indicated no SiH remaining, and then they were devolatilized as before. The following are the analysis and 4-week aged release results derived by substituting these resins into formulations essentially identical to example 3D:

|  | Viscosity, Cst | Me/Kg Epoxy | Relase g/2 in |
|---|---|---|---|
| (A) | 22 | 1273 | 120 |
| (B) | 22 | 1316 | 125–135 |
| (C) | 32 | 1215 | 85–90 |

EXAMPLE 5

To illustrate that the epoxy group can also be placed on a non-terminal silicon and give a controlled release effect, a resin was prepared as in Example 2 except that the following reagents were used: 206.7 g trimethylchlorosilane, 77.4 g methyldichlorosilane, 525.0 g dimethyldichlorosilane, 200.0 g tetraethylorthosilicate and 344.0 g toluene were added to 940.0 g water. The resulting methylhydrogen resin had a hydrogen (as SiH) level of 0.13%. To a mixture of 482.5 g of this resin and 0.016 g chlorotris(triphenylphosphine) Rh (I) at 145° C. was added 76.1 g VCHO. Thirty-six hours at this temperature were required for completion of the reaction. The devolatilized resin that resulted had a viscosity of 53 cstk and an epoxy content of 973 meq/kg. This resin was evaluated in formulation essentially identical to example 3D and gave 115 g/2 in of release after aging.

EXAMPLE 6

The next two examples illustrate that methyltrichlorosilane may be substituted for the tetraethylorthosilicate (i.e. "T" can be substituted for "Q"). Example 1 was repeated except the following were used as starting materials:

| | |
|---|---|
| Methyltrichlorosilane | 118.7 g |
| Dimethyldichlorosilane | 500.0 g |
| Dimethylchlorosilane | 51.5 g |
| Trimethylchlorosilane | 110.0 g |
| Toluene | 265.0 g |
| Water | 724.0 g |

The methylhydrogen resin had a hydrogen level (as SiH) of 0.103%. 225.0 g of this material was hydrosilated with 39.4 g VCHO in the presence of 0.016 g Rhodium catalyst. After 3.5 hours no SiH was detected by IR. Therefore, the material was devolatilized to give a viscosity of 9 cstk, and an epoxy content of 983 meq/kg. When substituted into formulation 3D this material gave an aged release value of 85–100 g/2 in.

EXAMPLE 7

The process of Example 6 was repeated except the following materials were used:

| | |
|---|---|
| Dimethylchlorosilane | 47.0 g |
| Trimethylchlorosilane | 270.0 g |
| Methyltrichlorosilane | 300.0 g |
| Toluene | 210.0 g |
| Water | 575.0 g |

The methylhydrogen resin had a 0.131% hydrogen content and after reacting with VCHO, the resulting devolatized epoxy resin had a viscosity of 20 cstk and an epoxy content of 961 meq/kg. The aged release when evaluated in example 3D formulation gave 100 g/2 in release.

EXAMPLE 8

This example illustrates that mixtures of "T" and "Q" resins can be effective CRA additives. Example 2 was repeated except that two epoxy resins were prepared starting from the following materials:

| | Resin "A" | Resin "B" |
|---|---|---|
| Trimethylchlorosilane | 97.8 g | 34.2 g |
| Dimethylchlorosilane | 50.6 g | 88.3 g |
| Dimethyldichlorosilane | 457.8 g | 400.0 g |
| Methyltrichlorosilane | 53.9 g | 47.1 g |
| Tetraethylorthosilicate | 75.0 g | 65.5 g |
| Toluene | 250.0 g | 216.0 g |
| Water | 685.0 g | 590.0 g |

The hydrogen content (as SiH) of resins A and B were 0.124 and 0.31%, respectively. The corresponding VCHO functionalized resins were prepared as in Example 2 above, and gave the following analytical and aged release results:

| | Viscosity, cstk | meq/kg Epoxy | Release, g/2 in |
|---|---|---|---|
| Resin "A" Derived | 20 | 1040 | 100 |
| Resin "B" Derived | 30 | 1942 | 115–125 |

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A method of using a controlled release additive to produce a controlled release surface comprising the steps:
   (i) applying a curable organopolysiloxane release coating composition to a surface with the composition comprising:
   (A) from about 1 to about 98% by weight of the curable composition of an epoxy-functional siloxane which functions as a release additive to control adhesion comprising unit(s) of the formula (I):

$$R_a R_b^1 SiO_{(4-a-b)/2} \qquad (I)$$

and unit(s) of the formula (II);

$$R SiO_{3/2} \qquad (II)$$

where R is unsubstituted or substituted $C_{(1-8)}$ alkyl, $R^1$ is a monovalent epoxy-functional organic radical of from 2 to about 20 carbon atoms; a is 1, 2 or 3; b is 0, 1, 2 or 3; and a+b is 2 or 3; and with the provision that at least one unit of formula (I) contains an unsubstituted or substituted epoxy-functional radical per molecule;
   (B) from about 1 to about 98% by weight of the curable composition of a vinyl-functional siloxane which functions as a release compound's base composition with at least 2 to about 6 units of the formula:

$$R_c R_d^2 SiO_{(4-c-d)/2}$$

where R is as defined above, $R^2$ is unsubstituted or substituted vinyl-functional $C_{(1-8)}$ alkenyl; c is 0, 1, 2 or 3; d is 0, 1, 2 or 3; and c+d is 2 or 3;
   (C) an effective amount of a temperature-dependent hydrosilation addition reaction inhibitor;
   (D) an effective amount of a hydrosilation catalyst; and
   (E) from about 1 to about 10% by weight of the curable composition of an organopolysiloxane which functions as a crosslinker consisting essentially of units of the formula and combinations thereof:

$$R_e(H)_f SiO_{(4-e-f)/2}$$

where R is as defined in (A); e is 0, 1 or 2; f is 0, 1, 2 or 3; and e+f is 0, 1, 2 or 3; and (ii) heating the composition applied in step (i) to a temperature from between about 70° C. to about 300° C., until said composition cures.

2. The curable composition set forth in claim 1, wherein the ratio of formula (I) units to formula (II) units is from about 0.4 to about 2.0.

3. The curable composition set forth in claim 2, wherein the ratio of formula (I) units to formula (II) units is from about 0.6 to about 1.5.

4. The curable composition set forth in claim 1, wherein said epoxy-functional siloxane additive additionally comprises at least one unit of the formula (III) which functions to further control adhesion:

$$SiO_{4/2} \qquad (III).$$

5. The curable composition set forth in claim 4, wherein the ratio of formula (I) units to formula (II) and (III) units is from about 0.4 to about 2.0.

6. The curable composition set forth in claim 5, wherein the ratio of formula (I) units to formula (II) and (III) units is from about 0.6 to about 1.5.

7. The curable composition set forth in claim 1, wherein (C) is selected from the group of dialkyl carboxylic esters and hydroperoxides.

8. The curable composition set forth in claim 1, wherein (D) is a platinum, palladium, rhodium, iridium, iron, or cobalt metal complex catalyst.

9. A method of using a controlled release additive to produce a controlled release surface comprising the steps:

(i) applying a curable organopolysiloxane release coating composition to a surface with the composition comprising:

(A) from about 1 to about 98%, by weight of the curable composition of an epoxy-functional siloxane which functions as a release additive to control adhesion comprising unit(s) of the formula (I):

$$R_aR_b^1SiO_{(4-a-b)/2}$$

and unit(s) of the (III);

$$SiO_{4/2}$$

where R is unsubstituted or substituted $C_{(1-8)}$ alkyl, $R^1$ is a monovalent epoxy-functional organic radical of from about 2 to about 20 carbon atoms; a is 1, 2 or 3; b is 0, 1, 2 or 3; and a+b is 2 or 3; and with the provision that at least one unit of formula (I) contains an unsubstituted or substituted epoxy-functional radical per molecule;

(B) from about 1 to about 98% by weight of the curable composition of a vinyl-functional siloxane which functions as a release compound's base composition with at least two to about 6 units of the formula:

$$R_cR_d^2SiO_{(4-c-d)/2}$$

where R is as defined above, $R^2$ is unsubstituted or substituted vinyl-functional $C_{(1-8)}$ alkenyl; c is 0, 1, 2 or 3; d is 0, 1, 2 or 3; and c+d is 2 or 3;

(C) an effective amount of a temperature-dependent hydrosilation addition reaction inhibitor;

(D) an effective amount of a hydrosilation catalyst; and (E) from about 1 to about 10% by weight of a curable composition an organopolysiloxane which functions as a crosslinker consisting essentially of units of the formula and combinations thereof:

$$R_e(H)_fSiO_{(4-a-b)/2}$$

where R is as defined in (A); e is 0, 1 or 2; f is 0, 1, 2 or 3 and e+f is 2 or 3; and (ii) heating the composition applied in step (i) to a temperature from between about 70° C. to about 300° C., until said composition cures.

10. The curable composition set forth in claim 9, wherein the ratio of formula (I) units to formula (III) units is from about 0.4 to about 2.0.

11. The curable composition set forth in claim 9, wherein the ratio of formula (I) units to formula (III) units is from about 0.6 to about 1.5.

12. The curable composition set forth in claim 9, wherein (C) is selected from the group of dialkyl carboxylic esters and hydroperoxides.

13. The curable composition set forth in claim 9, wherein (D) is a platinum, palladium, rhodium, iridium, iron, or cobalt metal complex catalyst.

* * * * *